United States Patent Office

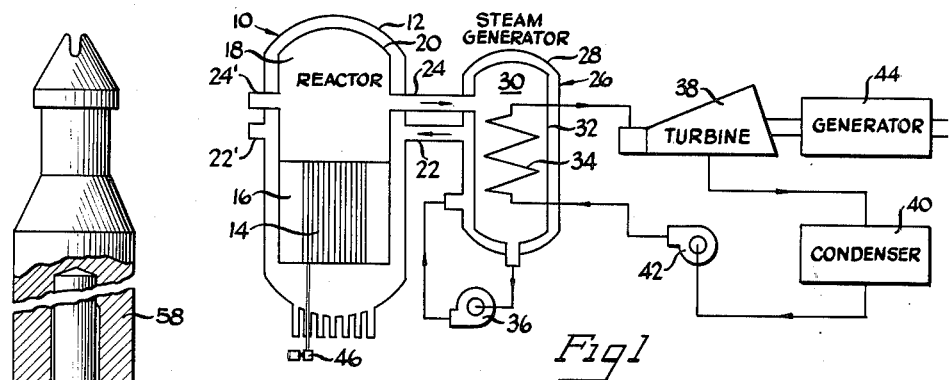
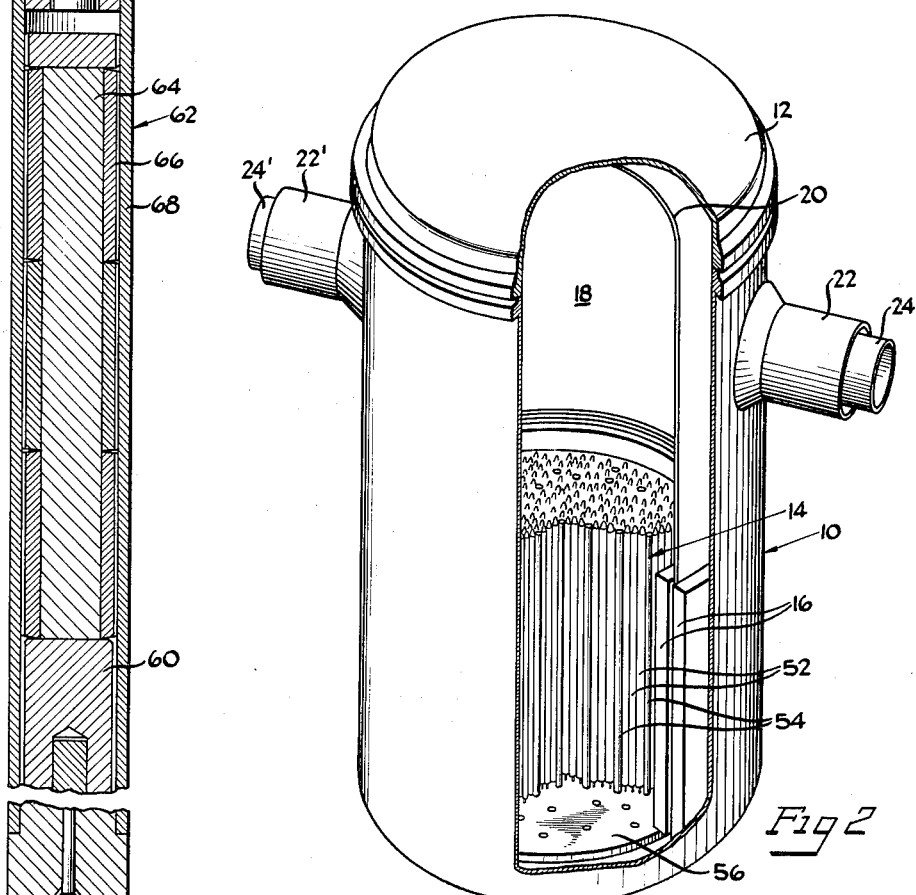
Inventors
HUGH B. STEWART
EDWARD J. LESHAN
By
Atty's

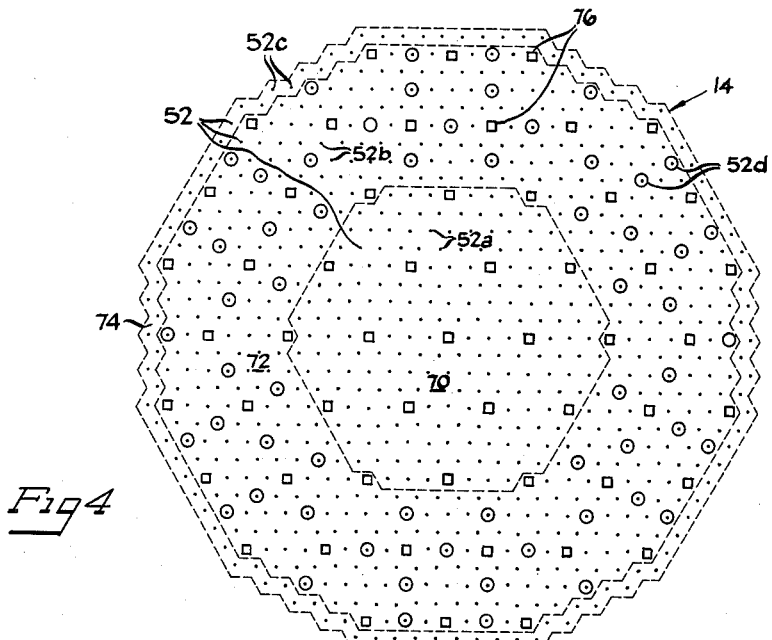

3,205,139
Patented Sept. 7, 1965

3,205,139
HIGH TEMPERATURE REACTOR WITH SPECIFIC DISTRIBUTION OF NON-1/v. ABSORBER AND FERTILE MATERIAL
Hugh B. Stewart, Rancho Santa Fe, Calif., and Edward J. Leshan, deceased, late of San Diego, Calif., by Paulette Leshan, legal representative, Albany, Calif.; said Hugh B. Stewart, assignor, by mesne assignments, to the United States of America as represented by the United States Atomic Energy Commission
Filed Oct. 31, 1963, Ser. No. 322,273
1 Claim. (Cl. 176—18)
(Filed under Rule 47(a) and 35 U.S.C. 116)

The present invention relates generally to high temperature nuclear reactors and more particularly to a high temperature nuclear reactor having improved safety characteristics by virtue of particular distributions of material in the reactor.

In order to sustain a chain reaction in a nuclear reactor, each nucleus in the reactor core which captures a neutron and undergoes fission must produce, on the average, at least one neutron which in turn causes fission of another nucleus in the reactor. The reactor is said to be critical when the number of neutrons produced by fission in any one generation is equal to the number of corresponding neutrons in the previous generation so that a chain reaction will be maintained at a constant rate of fission and at a given power level. The fraction by which the ratio of these numbers is greater than unity is the reactivity of the reactor. There is need for making excess reactivity available in a reactor in order to bring the reactor up to a desired operating power level and also to compensate for the buildup of neutron-absorbing materials in the system. In the latter regard, as fissioning proceeds, fission products which absorb neutrons accumulate in the system and, accordingly, tend to decrease the reactivity of the system. It is also desirable to have excess reactivity in order to allow for any decrease occasioned by the burning up of fuel.

At the same time, it is important for safety's sake to control this excess reactivity. When excess reactivity is introduced into a reactor system, the reactor continuously increases in power, and if the reactivity is not controlled, this can result in a violent increase in the heat generated in the system and consequent damage to the reactor and operating personnel. In order to prevent such an occurrence, it is conventional to include certain safety measures. Control rods are provided in the reactor, which control rods contain neutron absorbing materials or poisons. The control rods can be inserted and withdrawn from the reactor as needed to maintain desired power levels in the reactor.

Moreover, various burnable poisons, such as boron, have been suggested for use in nuclear reactors to compensate for the build-up of fission product poisons in the system. Burnable poisons are neutron absorbers that are substantially used up during the life of the reactor. Thus, burnable poisons have been added to the reactor system to aid compensating for the high initial excess reactivity required in the system. The concentration of burnable poisons initially added to the reactor is such that the burnable poisons are burned up in the reactor at a rate to compensate reactivity charges arising from the depletion of fuel and accumulation of fission product poisons during operation of the reactor.

To prevent the power level of a reactor from exceeding a safe level it is desirable to provide improved means for controlling excess reactivity.

Gas-cooled high temperature nuclear reactors are particularly attractive in that they offer the possibility of higher thermodynamic efficiencies by generating higher temperature steam.

To provide a reactor with the desired safety characteristics, it is desirable for the reactivity of the reactor to decrease as the reactor temperature increases, particularly above the normal operating temperature of the reactor. Such a reactor is inherently safe, for when excess reactivity produces an increase in temperature, this increased temperature reduces the reactivity until the reactor is again critical. Such a reactor is said to have a negative temperature coefficient of reactivity.

If a reactor were provided with a sufficiently large prompt negative temperature coefficient of reactivity to prevent the reactor from an excessive or damaging power surge if all of the excess reactivity were suddenly dumped into the reactor, the reactor would be inherently substantially safe. By a prompt temperature coefficient is meant one that does not require the flow of reactor heat from one region to another in order to be effective.

It has previously been known that certain so-called non-1/v. absorbers, such as rhodium-103, erbium-167 and plutonium-240, provide a negative coefficient of reactivity. According to the present invention, such poisons are distributed in the reactor core in a particular manner in order to enhance this negative coefficient of reactivity.

It has been known in the prior art to distribute the materials of the reactor core in order to provide what is called a flat flux, i.e., a relatively uniform distribution of neutron flux throughout the reactor. This has been achieved by appropriate distribution of fuel, fertile materials, control rods and poisons. In accordance with the present invention, the core materials are distributed in such manner as to increase the negative coefficient of reactivity while still achieving a relatively flat flux or some other desired flux shape. More particularly, in accordance with the present invention, non-1/v. absorbers or resonance absorbers or both are distributed in accordance with the temperature distribution in the core of a reactor having different regions thereof at substantially different temperatures.

This invention has particular applicability to reactors having a circulating coolant and most particularly to high temperature gas-cooled reactors. Such reactors may conventionally be generally cylindrical with a vertical axis and may have a gaseous coolant passing upwardly through the core. The gas serves as a heat transfer agent, extracting heat from the core and transferring it to an external heat exchange unit where it may be used to generate steam and be converted into a more useful form of energy. Such circulation of the coolant cools the regions of the core near the coolant influx and transfers heat toward the coolant efflux. This causes the reactor core to be hotter toward the upper central part and to be cooler in the lower outside part.

In accordance with the present invention, non-1/v. absorbers are placed selectively in the hotter upper central part, whereas resonance absorbers, preferably fertile materials such as thorium-232 and uranium-238, are placed in the cooler lower outside portions.

As the term is used herein, an absorber is a material that removes neutrons from the reactor. The ability of materials to absorb neutrons varies with the energy of the neutrons. Generally speaking, the absorption follows a 1/v. relationship; that is, the absorption is inversely-proportional to the velocity of the neutron and hence decreases with increasing energy. However, this absorption characteristic includes anomalies for the various absorbing elements. There are particular energies at which the absorbing property is very much increased, showing a resonance at such energies. Neutrons having the energies of such resonances are readily absorbed, as are neutrons near such resonance energies.

Temperature also affects the resonances of resonance absorber materials by a Doppler effect. Increased temperature broadens the resonances and, for sufficiently large concentration of the fertile material in geometric arrangements which shield the fertile material with respect to the neutron flux in the moderator, will increase the likelihood of neutron absorption. Thus, the Doppler effect in resonance absorber materials provides a negative temperature coefficient of reactivity. It happens, however, that the negative coefficient of reactivity associated with the Doppler effect becomes smaller at higher temperatures.

Where the resonance is near but slightly above thermal energies, the absorber may be called a non-1/v. absorber because thermal neutrons are not absorbed in the 1/v. manner. An increase in temperature increases the thermal energies of the neutrons, and gives them energies nearer the resonance, thus increasing their likelihood of being captured and absorbed. In other words, the absorption of thermal neutrons increases with temperature. In the case of high temperature gas-cooled reactors where the coolest part of any fuel compact is about 1000° F. and the hottest part of any fuel compact is about 2700 F., the resonance for the non-1/v. absorber should be of the order of 1 ev., preferably from about 0.5 ev. to 1.5 ev. Under such circumstances, the negative coefficient of reactivity occasioned by non-1/v. absorber materials increases with increasing temperature.

According to the present invention, the safety of the reactor is improved by distributing the absorber material so as to increase the overall negative coefficient of reactivity. In particular, non-1/v. absorber materials responding to changes in the moderator temperature should be placed at the hotter parts of the reactor and resonance absorbers responding to the fuel temperature should be placed at the cooler parts of the reactor. Of course, it is not necessary that both be done in the same reactor.

As noted above, it may also be desirable to load the reactor in such manner as to provide a flat flux, flat power distribution, or some particular power shape. For this reason, it may be preferable that the non-1/v. absorber be chosen so that it is not removed completely by absorption, or is removed at some controlled rate during the fuel burning cycle. This poison may be a non-fertile material, such as RH–103 or ER–167, or it may be a fertile material such as PU–240.

On the other hand, the resonance absorber is preferably a fertile material. It is preferably placed in the cooler lower outside part of the reactor where the temperature is generally lower. Fertile materials are materials which upon neutron capture, are converted into fuel, i.e., fissionable materials. Thorium–232 and uranium–238 are preferred fertile materials.

Therefore, a primary object of the present invention is to achieve improved safety characteristics for high temperature nuclear reactors, particularly for high temperature nuclear reactors having circulating gas coolant. It is a further object of the present invention to achieve an increased negative temperature coefficient of reactivity by distributing absorber materials in the core in accordance with the temperature distribution in the core. It is still another object of the invention to distribute absorber materials in the reactor core in such manner as to increase the negative coefficient of reactivity and at the same time to achieve a desirable power distribution. Further objects and advantages of the present invention will be apparent from consideration of the following detailed description when read in conjunction with the accompanying drawings in which:

FIGURE 1 is a diagrammatic illustration of a nuclear reactor system, utilizing the reactor of the present invention;

FIGURE 2 is an illustration, partly in section, of one form of nuclear reactor useful in the system of FIGURE 1;

FIGURE 3 is a sectional view of one form of fuel element useful in a reactor as shown in FIGURE 2;

FIGURE 4 is a diagrammatic illustration of a radial distribution of elements that may be used in accordance with the present invention in the reactor shown in FIGURE 2; and FIGURE 5 is a diagrammatic illustration of an axial distribution of material that may be used in accordance with the present invention in the reactor shown in FIGURE 2.

In FIGURE 1 there is illustrated an over-all nuclear reactor system of the high temperature gas-cooled type. The reactor 10 itself is contained in a pressure vessel 12. The reactor core 14 is disposed in the lower part of the vessel 12 and is surrounded by a reflector 16. Above the core is a plenum chamber 18 enclosed by a shroud 20. Helium gas is the preferred coolant, circulating upwardly through the reactor core. Relatively cool helium is admitted to the pressure vessel through an inlet pipe 22 and passes downwardly outside the reactor core to the bottom of the pressure vessel, thence upwardly through the hot core to the plenum chamber 18 and out through an outlet pipe 24 at an elevated temperature. The high temperature helium then passes to a steam generator 26. The steam generator includes an outer housing 28 and an inner chamber 30 defined by an inner housing 32. The high temperature gas passes into the inner chamber 30 where it comes into contact with a heat exchanger 34 which contains water that is boiled by the heat of the high temperature helium, thus cooling the helium which is thereafter pumped by a compressor 36 into the space between the inner and outer housings and thence from the steam generator back to the inlet pipe 22 of the reactor 10. The steam from the heat exchanger passes to a turbine 38 and thence to a condenser 40 where it is condensed to water and then pumped by a pump 42 back into the steam generator. Passing through turbine, the steam drives the turbine 38 which in turn turns an electrical generator 44 thus converting the thermal energy produced in the reactor into electrical energy out of the generator 44. The reactor also includes control rod drives 46, only one of which is shown in FIGURE 1. Also as indicated in FIGURE 1, there may be pipes 22' and 24' which are coupled to additional steam generators like generator 26 as illustrated.

The reactor 10 may take the form shown in greater detail in FIGURE 2. As shown in FIGURE 2 the inlet pipe 22 preferably surrounds the outlet pipe 24 so that the hotter pipe is not exposed to ambient temperature and cooled before reaching the stem generator. This also permits the use of a thin-walled pipe and material that might otherwise be structurally unsuitable for the high temperature pipe. As shown in FIGURE 2, the reactor core 14 is comprised of a plurality of fuel elements 52 and control rods 54 mounted on a core support plate 56. Each fuel element may take the form shown in FIGURE 3. Its principal components are an upper reflector assembly 58 and a lower reflector assembly 60 with a fuel compact assembly 62 therebetween. The fuel compact assembly comprises a central element or spine 64 on which are mounted fuel compacts 66 surrounded by a sleeve 68.

In FIGURE 4 is shown diagrammatically a horizontal cross section of a preferred arrangement of elements in the reactor core 14. The fuel elements 52 are preferably arranged in a regular array, generally cylindrical. These fuel elements are located in three distinct regions, an axial region 70, an intermediate region 72 and a peripheral region 74. Distributed at regular intervals in the core are control rods 76. The fuel elements 52a in region 70 are loaded with a substantial amount of non-1/v.

absorber material, preferably rhodium–103. The fuel elements 52b in region 72 are preferably more lightly loaded with non-1/v. absorber material, preferably the same material. The fuel elements 52c in the peripheral region 74 are preferably not loaded with non-1/v. absorber material. Rather, these peripheral fuel elements 52c are preferably more heavily loaded with resonance absorbers, preferably thorium–232, while at the same time containing less of the fuel, such as uranium–235. The rest of the fuel elements 52a and 52b contain both the fuel and the fertile material, but contain a greater amount of fuel and lesser amount of fertile material than the peripheral fuel elements 52c. All of the fuel elements contain moderator material such as carbon, preferably in the form of graphite. Certain of the fuel elements in the intermediate region, denoted as elements 52d, contain the non-1/v. absorber material, but also have spines poisoned with burnable poison, preferably natural boron.

FIGURE 5 shows diagrammatically a vertical section of the reactor core 14. The individual fuel elements and control rods are not shown. Rather, only the regions are illustrated. As shown, the regions may be broken down axially as well as radially. The axial region 70 comprises an upper axial region 70a, a middle axial region 70b and a lower axial region 70c. Similarly, the intermediate region 72 comprises an upper intermediate region 72a, a middle intermediate region 72b and a lower intermediate region 72c. The peripheral region 74 comprises an upper peripheral region 74a, a middle peripheral region 74b and a lower peripheral region 74c. As can be seen from FIGURE 1, the coolant is circulated upwardly through the core 14. Because of conduction and radiation from the periphery of the core and the cooling effect of the gas coolant the hottest part of the reactor is in the middle axial region 70b, which is nearer the top than the bottom of the reactor, while the coolest part of the reactor is in the lower peripheral region 74c. Middle intermediate region 72b is also relatively hot, but the other regions are of intermediate temperature, neither relatively hot nor relatively cool. In accordance with the invention, the non-1/v. absorber, preferably rhodium–103, is most heavily concentrated in region 70b with a lesser concentration of this material disposed in region 72b and substantially none in the other regions. At the same time, the resonance absorber, preferably fertile material such as thorium–232, is disposed in region 74c. Fertile material could also be more heavily loaded in regions 70c and 72c which are relatively cooler than the upper regions. To achieve flat flux, region 74a and 74b also contain more fertile material and less fuel material than the rest of the reactor core, however, preferably not so much resonance material as region 74c. Were region 74 to have the same fuel and fertile material distribution as the rest of the core, there would be a power peak at the core-reflector interface occasioned by cold neutrons streaming into the core from the reflector.

Without limiting the generality of the present invention, the following specific reactor configuration and composition has been found suitable to achieve the objects of the present invention. The configuration of the reactor is as shown in FIGURES 4 and 5. The axial region 70 has a radius of 26.78 inches; the ring 72 has a thickness of 24.59 inches; and the peripheral ring 74 has a thickness of 3.57 inches. The height of the lower regions 70c and 72c and 74c is 27 inches; the height of the middle regions 70b, 72b and 76b is 54 inches, and the height of the upper regions 70a, 72a and 74a is nine inches. The initial loading of the reactor is:

|  | Kg. |
|---|---|
| Th–232 | 1652.2 |
| U–235 | 220.0 |
| U–238 | 16.05 |
| Rh–103 | 8.0 |
| Carbon | 21,406 |
| Natural boron | 1.098 |

The C:Th:U–235 atom ratios are

| | |
|---|---|
| Axial and intermediate regions: | 1818:6.2:1.0 |
| Peripheral region | 2846:24:1.0 |

The burnable poisons spines are placed in holes in the spines of the sixty fuel elements 52d. The loading of the fuel elements and the dimensions of the fuel elements are as shown in Table I.

*Table I. Fuel element dimensions and loadings*

|  | Outer Dia., in. | U-235 | Loading Per Compact—gm. | | | Rh-103 in 54" Middle Section | Nat. Boron gm./ Spine |
|---|---|---|---|---|---|---|---|
|  |  |  | U-238 | Th-232 | C |  |  |
| Spine | 1.750 |  |  |  |  |  |  |
| Burn. Poison compact | .860 |  |  |  |  |  | 18.3 |
| Compact | 2.750 |  |  |  |  |  |  |
| Axial Region |  | 4.8495 | .3537 | 29.652 | 149.43 | 0.6072 |  |
| Intermediate region |  | 4.8495 | .3537 | 29.652 | 149.43 | 0.2024 |  |
| Peripheral Region |  | 2.5712 | .1877 | 65.895 | 145.08 |  |  |
| Sleeve | 3.500 |  |  |  |  |  |  |

It is to be noted that in this particular example, it has been found desirable to have a uniform axial distribution of the fuel and fertile material. The negative coefficient of reactivity and the uniformity of the flux is adequate with the distribution described. Should it be desirable to increase the negative coefficient of reactivity, the axial distribution of the uranium and thorium could be changed in accordance with the invention as heretofore described. Under such circumstances, thorium would be more heavily concentrated in the lower region, 74c, and desirably also in regions 70c and 72c.

It is important to the present invention that the core material be distributed in accordance with the operating temperature distribution in the core in order to improve the prompt negative coefficient of reactivity. More particularly, in accordance with this invention non-1/v. neutron absorber material is concentrated in the hottest part of the reactor core which, in the case of a cylindrical core having coolant gas circulating axially upward through the core, is near the axis of the core toward the top. It should be noted, however, that "near the top" does not mean that the concentration is at the upper edge of the reactor, for it is preferable, as described above, that there be a layer near the upper edge that contains little or none of this neutron absorber material.

It has been noted that for the sake of safety, the reactivity should change promptly with temperature. Since the Doppler effect in the fertile material depends directly on the temperature of the fertile material itself, a prompt response is obtained by intimately mixing the fertile material with the fuel material in the fuel compact 66. The reactivity contribution from the non-1/v. materials, however, is determined by the average temperature of the moderator material which determines the spectrum of thermal neutron energies. Therefore a portion of the contribution to the temperature coefficient from the non-1/v. absorbers is obtained promptly since the fuel compact heats more rapidly than the spine or sleeve during a power transient. The relative volumes of the spine, compact, and sleeve may therefore be varied in the regions containing the non-1/v. absorbers material in order to make the average moderator temperature increase more rapidly during a power transient, although this is not done in the specific example given.

It is to be understood that although certain preferred embodiments of the present invention have been shown and described, alternative structures are within the present invention, which is limited only by the claims.

What is claimed is:

A high temperature nuclear reactor having a generally cylindrical reactive core having a vertical axis, a coolant circulating axially upward through said core, a reflector surrounding said core, and means for controlling the reactivity of said reactor while providing a substantially flat neutron flux, said means comprising non-1/v. neutron poison material and fertile resonance neutron absorber material disposed in said reactor core, said neutron poison material and said fertile material being present in an amount sufficient to provide a substantial prompt negative contribution to the temperature coefficient of reactivity of said reactor, said poison material being more concentrated near the axis of said core in the regions near the top of said core, and said fertile material being more concentrated near the periphery of said core in the regions near the bottom of said core.

References Cited by the Examiner

UNITED STATES PATENTS 3,137,636  6/64  Wilkner _____ 176—58
3,141,829  7/64  Fortescue et al. _____ 176—71

OTHER REFERENCES

Glasstone et al., "Nuclear Reactor Engineering," Jan. 28, 1963, pp. 700–707, publ. by Van Nostrand Co.

Radkowsky, 2nd Geneva Conference, vol. 13, pp. 426–445, published by United Nations.

Volkov et al., "Use of Burnable Poisons in Nuclear Reactors" in Atomnaya Energiya, vol. 11, No. 2, pp. 109–125, August 1961.

CARL D. QUARFORTH, *Primary Examiner.*

REUBEN EPSTEIN, *Examiner.*